United States Patent
Lee et al.

(10) Patent No.: US 9,798,057 B2
(45) Date of Patent: Oct. 24, 2017

(54) COMPOSITION FOR POLARIZATION FILM, POLARIZATION FILM, AND DISPLAY DEVICE

(71) Applicants: SAMSUNG ELECTRONICS CO., LTD., Suwon-si, Gyeonggi-do (KR); KYUNGPOOK NATIONAL UNIVERSITY INDUSTRY-ACADEMIC COOPERATION FOUNDATION, Daegu (KR)

(72) Inventors: Yong Joo Lee, Suwon-si (KR); Deuk Kyu Moon, Seoul (KR); Sang Ho Park, Anyang-si (KR); Jae Hong Choi, Daegu (KR); Beom Seok Kim, Seoul (KR); Jong Hoon Won, Yongin-si (KR); Feifei Fang, Suwon-si (KR); Myung Sup Jung, Seongnam-si (KR)

(73) Assignees: SAMSUNG ELECTRONICS CO., LTD., Gyeonggi-Do (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 561 days.

(21) Appl. No.: 14/244,145

(22) Filed: Apr. 3, 2014

(65) Prior Publication Data

US 2014/0339482 A1 Nov. 20, 2014

(30) Foreign Application Priority Data

May 14, 2013 (KR) .................. 10-2013-0054491

(51) Int. Cl.
| | | |
|---|---|---|
| F21V 9/14 | (2006.01) | |
| G02F 1/1335 | (2006.01) | |
| G02B 5/30 | (2006.01) | |
| C09K 19/60 | (2006.01) | |

(52) U.S. Cl.
CPC .......... *G02B 5/3033* (2013.01); *C09K 19/601* (2013.01); *C09K 2219/03* (2013.01)

(58) Field of Classification Search
USPC ............ 252/585; 428/220; 264/1.34; 349/96
See application file for complete search history.

(56) References Cited

U.S. PATENT DOCUMENTS

2012/0050652 A1* 3/2012 Chang .................. B29C 43/003
349/96

FOREIGN PATENT DOCUMENTS

| JP | 57084409 A | | 5/1982 |
|---|---|---|---|
| JP | 11101964 | * | 4/1999 |
| JP | 11101964 A | | 4/1999 |
| JP | 2007316617 | * | 12/2007 |
| JP | 2007316617 A | | 12/2007 |
| JP | 2009-217012 | * | 9/2009 |
| JP | 2009217012 A | | 9/2009 |
| JP | 2010101983 A | | 5/2010 |
| JP | 2011-150162 | * | 8/2011 |
| JP | 2011150162 A | | 8/2011 |

OTHER PUBLICATIONS

Fedors, Robert F., "A Method for Estimating Both the Solubility Parameters and Molar Volumes of Liquids," Polymer Engineering and Science, Feb. 1974, vol. 14, No. 2, pp. 147-154.
Karst, et al, "Using the Solubility Parameter to Explain Disperse Dye Sorption on Polylactide," Journal of Applied Polymer Science vol. 96, p. 416-422, (2005).

* cited by examiner

*Primary Examiner* — Monique Peets
(74) *Attorney, Agent, or Firm* — Cantor Colburn LLP

(57) ABSTRACT

A composition for a polarization film including: a transparent resin having a boiling point of greater than or equal to 130° C.; and a dichroic dye represented by Chemical Formula 1, Chemcial Formula 1

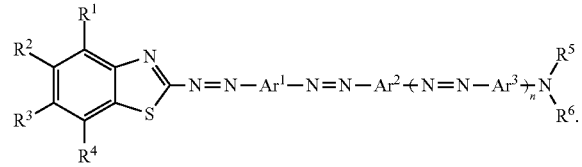

16 Claims, 4 Drawing Sheets

COMPOSITION FOR POLARIZATION FILM, POLARIZATION FILM, AND DISPLAY DEVICE

This application claims priority to and the benefit of Korean Patent Application No. 10-2013-0054491 filed on May 14, 2013, and all the benefits accruing therefrom under 35 U.S.C. §119, the content of which is incorporated herein in its entirety by reference.

BACKGROUND

1. Field

A composition for a polarization film, a polarization film, and a display device are disclosed.

2. Description of the Related Art

A display device such as a liquid crystal display ("LCD") and an organic light emitting diode ("OLED") device includes a polarization plate attached to the outside of a display panel. The polarization plate transmits light of a specific wavelength and absorbs or reflects light of other wavelengths. Thus, the polarization plate may control the direction of incident light on the display panel or light emitted from the display panel.

The polarization plate generally includes a polarizer and a protective layer for the polarizer. The polarizer may be formed from, for example, polyvinyl alcohol ("PVA"), and the protective layer may be formed from, for example, triacetyl cellulose ("TAC").

However, manufacture of the polarization plate including the polarizer and the protective layer not only involves a complicated process and high production costs, and also results in a thick polarization plate which leads to an increased thickness of a display device.

Accordingly, there remains a need in the art for a polarization film that does not require a protective layer.

SUMMARY

An embodiment provides a composition for a polarization film that may provide improved polarization properties.

Another embodiment provides a polarization film provided by the composition for a polarization film.

Yet another embodiment provides a display device including the polarization film.

According to an embodiment, a composition for a polarization film includes: a transparent resin having a boiling point of greater than or equal to 130° C.; and a dichroic dye represented by Chemical Formula 1, Chemcial Formula 1

$$\begin{array}{c}R^1\\R^2\overset{}{\underset{R^3}{\bigcirc}}\overset{N}{\underset{S}{\bigcirc}}-N=N-Ar^1-N=N-Ar^2+N=N-Ar^3\overset{}{\underset{n}{\rightarrow}}N\overset{R^5}{\underset{R^6}{\diagdown}}\\R^4\end{array}$$

wherein in Chemical Formula 1, $Ar^1$ to $Ar^3$ are each independently a substituted or unsubstituted C6 to C15 arylene group, $R^1$ to $R^4$ are each independently hydrogen, a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, at least one of $R^1$ to $R^4$ is a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, $R^5$ and $R^6$ are each independently hydrogen, a substituted or unsubstituted C1 to C20 alkyl group, or are linked to each other to form a ring, and n is an integer ranging from 0 to 2.

A difference between a solubility parameter of the transparent resin and a solubility parameter of the dichroic dye may be less than or equal to about 8.0.

The transparent resin may include a polyolefin, a polyester, or a combination thereof.

The transparent resin may include a polyolefin, and the polyolefin may include polyethylene, polypropylene, a copolymer thereof, or a combination thereof.

A solubility parameter of the polyolefin may be about 15 to about 18, and a solubility parameter of the dichroic dye may be less than or equal to about 26.

The polyolefin may be a combination of polypropylene and a polyethylene-polypropylene copolymer, and the polyethylene-polypropylene copolymer may have an ethylene content of about 1 to about 50 weight percent.

The transparent resin may include a polyester, and the polyester may include polyethylene terephthalate, polyethylene naphthalate, modified polyethylene terephthalate glycol, a copolymer thereof, or a combination thereof.

A solubility parameter of the polyester may be about 15 to about 21, and a solubility parameter of the dichroic dye may be less than or equal to about 26.

The composition for a polarization film may have a solids content of greater than or equal to about 90 weight percent.

The composition for a polarization film may not include a solvent.

According to another embodiment, a polarization film includes a transparent resin having a boiling point of greater than or equal to 130° C. and the dichroic dye represented by Chemical Formula 1, Chemical Formula 1

$$\begin{array}{c}R^1\\R^2\overset{}{\underset{R^3}{\bigcirc}}\overset{N}{\underset{S}{\bigcirc}}-N=N-Ar^1-N=N-Ar^2+N=N-Ar^3\overset{}{\underset{n}{\rightarrow}}N\overset{R^5}{\underset{R^6}{\diagdown}}\\R^4\end{array}$$

wherein, in Chemical Formula 1, $Ar^1$ to $Ar^3$ are each independently a substituted or unsubstituted C6 to C15 arylene group, $R^1$ to $R^4$ are each independently hydrogen, a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, at least one of $R^1$ to $R^4$ is a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, $R^5$ and $R^6$ are each independently hydrogen, a substituted or unsubstituted C1 to C20 alkyl group, or are linked to each other to form a ring, and n is an integer ranging from 0 to 2.

A difference between a solubility parameter of the transparent resin and a solubility parameter of the dichroic dye may be less than or equal to about 8.0.

The transparent resin may include a polyolefin, a polyester, or a combination thereof.

The transparent resin may include a polyolefin, and the polyolefin may include polyethylene, polypropylene, a copolymer thereof, or a combination thereof.

A solubility parameter of the polyolefin may be about 15 to 18, and a solubility parameter of the dichroic dye may be less than or equal to about 26.

The transparent resin may include a polyester, and the polyester may include polyethylene terephthalate, polyethylene naphthalate, modified polyethylene terephthalate glycol, a copolymer thereof, or a combination thereof.

A solubility parameter of the polyester may be about 15 to about 21, and a solubility parameter of the dichroic dye may be less than or equal to about 26.

The polarization film may have a dichroic ratio of about 3 to about 10 at a maximum absorption wavelength of a visible ray region, wherein the dichroic ratio is represented by the Equation 1:

$$DR = \text{Log}(1/T_\perp)/\text{Log}(1/T_{//}) \qquad \text{Equation 1}$$

In Equation 1,

DR denotes a dichroic ratio of a polarization film, $T_{//}$ is a transmittance of a polarization film for light parallel to a transmissive axis of a polarization film, and $T_\perp$ is a transmittance of a polarization film for light perpendicular to the transmissive axis of the polarization film.

The polarization film may include a melt-blend of the transparent resin and the dichroic dye.

According to yet another embodiment, a display device including the polarization film is provided.

The display device may be a liquid crystal display ("LCD") or an organic light emitting diode ("OLED") display.

BRIEF DESCRIPTION OF THE DRAWINGS

These and other embodiments will become apparent and more readily appreciated from the following description taken in conjunction with the accompanying drawings in which.

DETAILED DESCRIPTION

Figure 1:
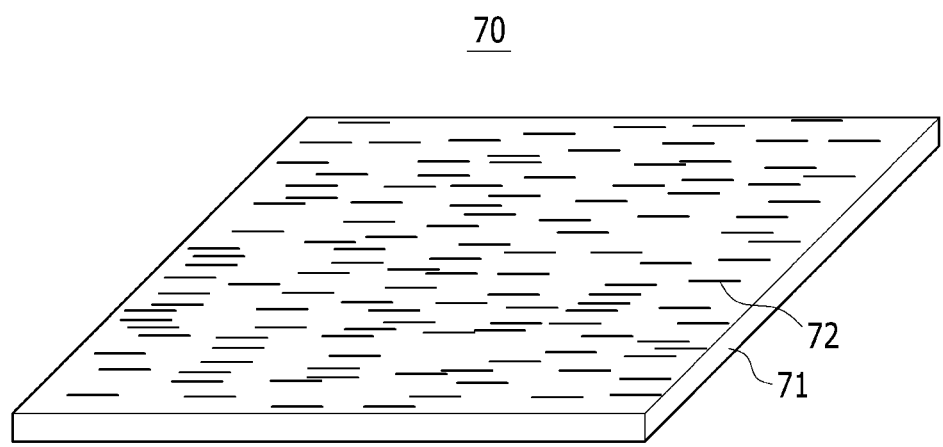
FIG. 1 is schematic view of an embodiment of a polarization film.

Hereinafter, exemplary embodiments of the present invention will be described in detail so that a person skilled in the art would understand them. However, this disclosure may be embodied in many different forms, and is not construed as limited to the exemplary embodiments set forth herein; rather, these embodiments are provided so that this disclosure will fully convey the scope of the invention to those skilled in the art. Thus, in some exemplary embodiments, well known technologies are not specifically explained to avoid ambiguous understanding of the present invention. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

The exemplary embodiments of the present invention described in the specification are explained referring to ideal exemplary drawings of schematic diagrams. Therefore, the parts exemplified in the drawings have outline properties and they are not to limit the categories of the invention. The same reference numerals designate the same constituent elements throughout the specification.

As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The terminology used herein is for the purpose of describing particular embodiments only and is not intended to be limiting. As used herein, the singular forms "a," "an" and "the" are intended to include the plural forms as well, unless the context clearly indicates otherwise. Unless specified otherwise, the term "or" means "and/or".

As used herein, a "mixture" refers to a combination of components in any form, for example, solution, alloy, or solid/liquid.

As used herein, when a definition is not otherwise provided, the term "substituted" refers to one substituted with at least one substituent selected from a halogen (F, Br, Cl, or I), a C1 to C20 alkoxy group, a C1 to C20 alkylthio group, a cyano group (—CN), an amino group (—NRR', wherein R and R' are independently hydrogen or a C1 to C6 alkyl group), a C1 to C20 ester group, a C1 to C20 alkyl group, a C1 to C20 aryl group, a C2 to C20 alkenyl group, a C2 to C20 alkynyl group, a hydroxy group (—OH), a nitro group (—NO$_2$), an azido group (—N$_3$), an amidino group (—C(=NH)NH$_2$), a hydrazine group (—NHNH$_2$), a hydrazono group (=N(NH$_2$), an aldehyde group (—C(=O)H), a carbamoyl group (—C(=O)NH$_2$), a thiol group (—SH), an ester group (—C(=O)OR, wherein R is a C1 to C6 alkyl group or a C6 to C12 aryl group), a carboxyl group (—C(=O)OH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof, in place of at least one hydrogen of a compound.

As used herein, the term "alkyl" refers to a monovalent group derived from a straight or branched chain saturated aliphatic hydrocarbon, and having a specified number of carbon atoms. Alkyl groups include, for example, methyl, ethyl, propyl, isopropyl, and hexyl.

As used herein, the term "alkenyl" refers to a monovalent group derived from a straight or branched chain saturated aliphatic hydrocarbon, having at least one double bond, and having a specified number of carbon atoms. Alkenyl groups include, for example, ethenyl and propenyl.

As used herein, the term "alkynyl" refers to a monovalent group derived from a straight or branched chain saturated aliphatic hydrocarbon, having at least one triple bond, and having a specified number of carbon atoms. Alkynyl groups include, for example, ethynyl and propynyl.

As used herein, the term "alkoxy" indicates "alkyl-O—", wherein the alkyl is the same as described above and having the specified number of carbon atoms. Non-limiting examples of the alkoxy group include methoxy, ethoxy, 1-propoxy, 2-propoxy, n-butoxy, t-butoxy, pentyloxy, hexyloxy, cyclopropoxy, and cyclohexyloxy.

As used herein, the term "alkylthio" indicates "alkyl-S—", wherein the alkyl is the same as described above and having the specified number of carbon atoms. Non-limiting examples of the alkylthio group include methylthio, ethylthio, 1-propylthio, 2-propylthio, n-butylthio, t-butylthio, pentylthio, hexylthio, cyclopropylthio, and cyclohexylthio.

As used herein, the term "alkanoyl" indicates "alkyl-C(=O)—", wherein the alkyl is the same as described above and having the specified number of carbon atoms. Non-limiting examples of the alkanoyl include acetyl, 1-propionyl, 2-propionyl, butanoyl, pentanoyl, hexanoyl, cyclopropanoyl, and cyclohexanoyl.

As used herein, the term "cycloalkyl" indicates a saturated hydrocarbon ring group, having only carbon ring atoms and having the specified number of carbon atoms. A non-limiting example of a cycloalkyl group includes cyclohexyl.

As used herein, the term "heterocycloalkyl" indicates a saturated hydrocarbon ring group, including at least one heteroatom selected from nitrogen (N), oxygen (O), phosphorous (P), and sulfur (S), wherein the rest of the cyclic atoms are carbon, and having the specified number of carbon atoms. A non-limiting example of a heterocycloalkyl group includes tetrahydro-2H-pyran-2-yl (C5H$_9$O—).

As used herein, the term "aryl" group, which is used alone or in combination, indicates a monovalent group derived from an aromatic hydrocarbon containing at least one ring, and having the specified number of carbon atoms. As used herein, the term "aryl" is construed as including a group with an aromatic ring fused to at least one cycloalkyl ring. Non-limiting examples of the "aryl" group include phenyl, naphthyl, and tetrahydronaphthyl.

As used herein, the term "heteroaryl" indicates a monovalent group derived from a monocyclic or bicyclic aromatic organic compound including at least one heteroatom selected from nitrogen (N), oxygen (O), phosphorous (P), and sulfur (S), wherein the rest of the cyclic atoms are carbon, and having the specified number of carbon atoms. The heteroaryl group may include, for example, one to five heteroatoms, and in some embodiments, may include a five- to ten-membered ring. In the heteroaryl group, S or N may be present in various oxidized forms.

Non-limiting examples of a monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

As used herein, the term "heteroaryl" is construed to include a heteroaromatic ring fused to at least one of an aryl group, a carbocyclic group, and a heterocyclic group.

Non-limiting examples of a bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-O— oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]

pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

As used herein, the term "arylene" indicates a divalent group formed by the removal of two hydrogen atoms from one or more rings of an aromatic hydrocarbon, wherein the hydrogen atoms may be removed from the same or different rings, each of which rings may be aromatic or nonaromatic. Non-limiting examples of the "arylene" group include a phenylene group, a naphthylene group, or a biphenylene group.

Hereinafter, a composition for a polarization film according to an embodiment is described.

The composition for a polarization film according to an embodiment includes a transparent resin and a dichroic dye.

The transparent resin may be selected from resins capable of being melt-blended and transformed into a film. In an embodiment, resins satisfying greater than or equal to predetermined light transmittance and crystallinity may be chosen.

The transparent resin may be selected from resins, for example, having a boiling point of greater than or equal to about 130° C., and in an embodiment, a boiling point ranging from about 130° C. to about 300° C. The transparent resin having a boiling point within the foregoing range may be melt-blended into a film.

The transparent resin may have average light transmittance of greater than or equal to about 85% in a visible ray region, and for example, average light transmittance ranging from about 85% to about 99%. In addition, the transparent resin may have crystallinity of less than or equal to about 60%, and for example, about 20% to about 60%.

A transparent resin satisfying these characteristics may include, for example, a polyolefin, a polyester, or a combination thereof.

The polyolefin may include, for example, polyethylene ("PE"), polypropylene ("PP"), a copolymer thereof, or a combination thereof. The polyolefin may be a mixture of at least two polymers selected from, for example, polyethylene ("PE"), polypropylene ("PP"), and a copolymer thereof, or may be, for example, a mixture of polypropylene ("PP") and a polyethylene-polypropylene copolymer ("PE-PP").

In an embodiment, the polypropylene ("PP") may have, for example, a melt flow index ("MFI") of about 0.1 gram ("g")/10 minutes ("min") to about 5 g/10 min. Herein, the melt flow index ("MFI") shows the amount of a polymer in a melt state flowing per 10 minutes, and relates to viscosity of the polymer in a melted state. In other words, as the melt flow index ("MFI") is lower, the polymer has higher viscosity, while as the melt flow index ("MFI") is higher, the polymer has lower viscosity. When the polypropylene ("PP") has a melt flow index ("MFI") within the range, properties of a final product as well as workability may be effectively improved. In an embodiment, the polypropylene ("PP") may have a melt flow index ("MFI") ranging from about 0.5 g/10 min to about 5 g/10 min.

The polyethylene-polypropylene copolymer ("PE-PP") may include about 1 weight % to about 50 weight %, for example, about 1 weight % to about 30 weight % of an ethylene group, based on the total amount of the copolymer. When the polyethylene-polypropylene copolymer ("PE-PP") includes the ethylene group within the range, phase separation of the polypropylene and the polyethylene-polypropylene copolymer ("PE-PP") may be effectively prevented or suppressed. In addition, the polyethylene-polypropylene copolymer ("PE-PP") may improve an elongation rate during elongation as well as have excellent light transmittance and alignment, improving polarization properties. In an embodiment, the polyethylene-polypropylene copolymer ("PE-PP") may include an ethylene group in an amount of about 1 weight % to about 25 weight %, for example, about 1 weight % to about 15 weight %, based on the total amount of the copolymer.

The polyethylene-polypropylene copolymer ("PE-PP") may have a melt flow index ("MFI") ranging from about 5 g/10 min to about 15 g/10 min. When the polyethylene-polypropylene copolymer ("PE-PP") has a melt flow index ("MFI") within the range, properties of a final product as well as workability may be effectively improved. In an embodiment, the polyethylene-polypropylene copolymer ("PE-PP") may have a melt flow index ("MFI") ranging from about 10 g/10 min to about 15 g/10 min.

When the polyolefin is a mixture of the polypropylene ("PP") and the polyethylene-polypropylene copolymer ("PE-PP"), the polypropylene ("PP") and the polyethylene-polypropylene copolymer ("PE-PP") may be present in a weight ratio of about 1:9 to about 9:1. When the polypropylene ("PP") and the polyethylene-polypropylene copolymer ("PE-PP") are included within the range, the polypropylene may be prevented from crystallizing and may have excellent mechanical strength, thus effectively improving the haze characteristics. In an embodiment, the polyolefin may include the polypropylene ("PP") and the polyethylene-polypropylene copolymer ("PE-PP") in a weight ratio of about 4:6 to about 6:4, and in another embodiment, in a weight ratio of about 5:5.

The polyolefin may have a melt flow index ("MFI") ranging from about 1 g/10 min to about 15 g/10 min. When the polyolefin has a melt flow index ("MFI") within the range, the polyolefin may not only secure excellent light transmittance since crystals are not excessively formed in the resin, but may also have appropriate viscosity for manufacturing a film and thus have improved workability. In an embodiment, the polyolefin may have a melt flow index ("MFI") ranging from about 5 g/10 min to about 15 g/10 min.

The polyolefin may have haze ranging from less than or equal to about 5%. When the polyolefin has haze within the range, transmittance of the polarization film may be increased, and thus its excellent optical properties may be secured. In an embodiment, the polyolefin may have haze of less than or equal to about 2%, and in another embodiment, about 0.5% to about 2%.

The polyolefin may have crystallinity of less than or equal to about 50%. When the polyolefin has crystallinity within the foregoing range, the polyolefin may have lower haze and display excellent optical properties. In an embodiment, the polyolefin may have crystallinity of about 30% to about 50%.

The polyester may include, for example polyethylene terephthalate ("PET"), polyethylene naphthalate ("PEN"), modified polyethylene terephthalate glycol ("PETG"), a copolymer thereof, or a combination thereof.

The polyester may have crystallinity of less than or equal to about 60%. When the polyester has crystallinity within the foregoing range, it may have decreased haze and display excellent optical properties. In an embodiment, the polyester may have crystallinity ranging from about 20% to about 60%. The dichroic dye may be a compound represented by Chemical Formula 1.

Chemcial Formula 1

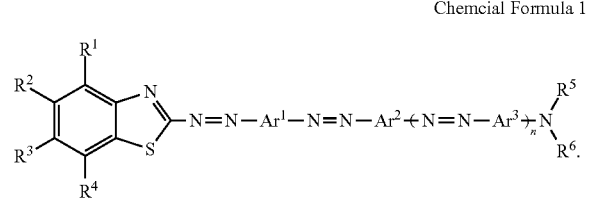

In Chemical Formula 1, $Ar^1$ to $Ar^3$ are each independently a substituted or unsubstituted C6 to C15 arylene group, $R^1$ to $R^4$ are each independently hydrogen, a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, at least one of $R^1$ to $R^4$ is a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, $R^5$ and $R^6$ are each independently hydrogen, a substituted or unsubstituted C1 to C20 alkyl group, or are linked to each other to form a ring, and n is an integer ranging from 0 to 2.

In Chemical Formula 1, $Ar^1$ to $Ar^3$ may include, for example, a substituted or unsubstituted phenylene group, a substituted or unsubstituted naphthalene group, or a substituted or unsubstituted biphenylene group. Herein, the substituted phenylene group, the substituted naphthalene group, and the substituted biphenylene group may be substituted with, for example, a C1 to C10 alkyl group, a halogen atom, a halogen-containing group, or a combination thereof.

One or two kinds of the dichroic dye may be combined (for example, mixed).

A difference between a solubility parameter of the transparent resin and a solubility parameter of the dichroic dye may be less than or equal to about 8.0. The solubility parameter indicates an interaction degree to which two or more compounds interact. The smaller solubility parameter difference the compounds have, the larger degree of interaction they have, while the larger solubility parameter difference the compounds have, the smaller degree of interaction they have.

The solubility parameter has a relation with the structure of a compound. When the dichroic dye and the transparent resin have a solubility parameter difference within the foregoing range, the transparent resin and the dichroic dye have high interaction during the manufacture of a polarization film, and may increase the melt-mixing property and thus prevent agglomeration of the dichroic dyes and uniformly disperse the dichroic dye in the transparent resin.

A difference between a solubility parameter of the transparent resin and a solubility parameter of the dichroic dye may be less than or equal to about 8.0, or less than or equal to about 7.4.

When the transparent resin is, for example, a polyolefin, the solubility parameter of the polyolefin may be, for example, about 15 to about 18, and the solubility parameter of the dichroic dye may be, for example, less than or equal to about 26.

When the transparent resin is, for example, a polyester, the solubility parameter of the polyester may be about 15 to about 21, and the solubility parameter of the dichroic dye may be, for example, less than or equal to 26.

The thermal decomposition temperature of the dichroic dye may be greater than or equal to about 245° C. Herein, the decomposition temperature indicates a temperature where the weight of the dichroic dye decreases by about 5% relative to its initial weight.

The dichroic dye may be included in an amount of about 0.01 to about 5 parts by weight, for example, about 0.01 to 3 parts by weight, based on 100 parts by weight of the transparent resin. When the dichroic dye is included within the foregoing range, sufficient polarization properties may be obtained without deteriorating transmittance of a polarization film. Within the above range, the dichroic dye may be included in an amount of about 0.05 to about 1 part by weight, for example, about 0.05 to about 0.5 parts by weight, based on 100 parts by weight of the transparent resin.

The composition for a polarization film may include the transparent resin and the dichroic dye each as a solid such as a powder. In an embodiment, the composition for a polarization film may include, for example, a solid content of greater than or equal to about 90 weight %, and for example, the composition for a polarization film may not include a solvent.

The polarization film may be manufactured by melt-blending and elongating the composition for a polarization film at a temperature of greater than or equal to the melting point ("Tm") of the transparent resin. For example, the polarization film may be manufactured by a process including melt-blending the composition for a polarization film to prepare a melt-blend, putting the melt-blend into a mold and pressing it into a sheet, and elongating the sheet in a uniaxial direction.

The melt-blending may be performed at a temperature of less than or equal to about 300° C., and in an embodiment, ranging from about 130 to about 300° C.

The sheet may be formed by putting the melt blend into the mold, and applying a high pressure to it or discharging it in a chill roll through a T-die.

The elongation in a uniaxial direction may be performed at a temperature ranging from about 25 to about 200° C. at an elongation rate ranging from about 400% to about 1,000%, for example, about 600% to about 1,000%. The elongation rate refers to a length ratio of after the elongation to before the elongation of the sheet, and means the elongation extent of the sheet after uniaxial elongation.

Hereinafter, a polarization film obtained from the composition for the polarization film is described referring to drawings.

FIG. 1 is a schematic view showing a polarization film according to an embodiment.

Referring to FIG. 1, a polarization film 70 according to an embodiment includes a transparent resin 71 and a dichroic dye 72.

The transparent resin 71 is elongated in a uniaxial direction, and the direction may be the length direction of the dichroic dye 72.

The dichroic dye 72 is dispersed into the transparent resin 71 and aligned in the elongation direction of the transparent resin 71. The dichroic dye 72 is a material that transmits one perpendicular polarization component of two perpendicular polarization components in a predetermined wavelength region.

The transparent resin 71 and dichroic dye 72 are respectively the same as described above.

The polarization film 70 may include a melt-blend of the transparent resin 71 and the dichroic dye 72. The melt-blend may be obtained by melt-blending the above-described composition for a polarization film at a temperature of greater than or equal to the melting point ("Tm") of the transparent resin 71.

The polarization film 70 may have a dichroic ratio of about 3 to about 10 at a maximum absorption wavelength ("$\lambda_{max}$") of a visible ray region. Herein, the dichroic ratio may be calculated by dividing plane polarization absorbance in a vertical direction with the axis of a polymer by polarization absorbance in a horizontal direction according to the following Equation 1.

$$DR = \text{Log}(1/T_\perp)/\text{Log}(1/T_{//}) \quad \text{Equation 1}$$

In Equation 1,

DR denotes a dichroic ratio of a polarization film, $T_{//}$ is light transmittance of a polarization film regarding light parallel to the transmissive axis of a polarization film, and $T_\perp$ is light transmittance of a polarization film regarding light perpendicular to the transmissive axis of the polarization film.

The dichroic ratio shows to what degree the dichroic dye 72 is arranged in the polarization film 70 in one direction. When the polarization film 70 has a dichroic ratio within the range in the visible ray wavelength region, the dichroic dye 72 is arranged according to arrangement of polymer chains, improving polarization properties of the polarization film 70.

The polarization film 70 may have polarization efficiency of greater than or equal to about 90%, and in an embodiment, ranging from about 95% to about 100% within the range. Herein, the polarization efficiency may be obtained by the Equation 2.

$$PE(\%) = [(T_{//} - T_\perp)/(T_{//} - T_\perp)]^{1/2} \times 100 \quad \text{Equation 2}$$

In Equation 2,

PE denotes polarization efficiency, $T_{//}$ is transmittance a polarization film regarding light parallel to the transmissive axis of a polarization film, and $T_\perp$ is transmittance a polarization film regarding light perpendicular to the transmissive axis of the polarization film.

The polarization film 70 may have light transmittance of greater than or equal to about 30%, and in an embodiment, ranging from about 30% to about 95% within the foregoing range. When the polarization film 70 having light transmittance within the range is applied to one side of a display device, light emitting from the display device may not be prevented.

The polarization film 70 may have a relatively low thickness of less than or equal to about 100 micrometers ("μm"), and for example, ranging from about 30 μm to about 95 μm. When the polarization film 70 has a thickness within the foregoing ranges, it may be significantly thinner than a polarization plate requiring a protective layer such as the one fabricated from triacetyl cellulose ("TAC") and contribute to realizing a thin display device.

The polarization film may be applied to various display devices.

The display device may be a liquid crystal display ("LCD").

Figure 2:
FIG. 2 is a cross-sectional view showing an embodiment of a liquid crystal display ("LCD")

FIG. 2 is a cross-sectional view showing a liquid crystal display (LCD) according to an embodiment.

Referring to FIG. 2, the liquid crystal display ("LCD") includes a liquid crystal panel 10 and a polarization film 20 disposed on both the lower part and the upper part of the liquid crystal display panel 10.

The liquid crystal panel 10 may be a twist nematic ("TN") mode panel, a patterned vertical alignment ("PVA") mode panel, an in-plane switching ("IPS") mode panel, an optically compensated bend ("OCB") mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown) and a first electric field generating electrode (not shown) connected thereto. The second display panel 200 may include, for example, a color filter (not shown) formed on the substrate and a second electric field generating electrode (not shown). However, it is not limited thereto, and the color filter may be included in the first display panel 100, and both the first electric field generating electrode and the second electric field generating electrode may be disposed in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axis thereof may be aligned substantially parallel to the surface of the first display panel 100 and the second display panel 200 when not applying an electric field, and may be aligned substantially perpendicular to the surface of the first display panel 100 and the second display panel 200 when applying an electric field. On the contrary, when the liquid crystal molecules have negative dielectric anisotropy, the long axis thereof may be aligned substantially perpendicular to the surface of the first display panel 100 and the second display panel 200 when not applying an electric field, and may be aligned substantially parallel to the surface of the first display panel 100 and the second display panel 200 when applying an electric field.

The polarization film 20 is disposed on the outside of the liquid crystal display panel 10. Although it is shown to be disposed on the upper part and lower part of the liquid crystal display panel 10 in the drawing, it may be formed on either the upper part or the lower part of the liquid crystal display panel 10.

The polarization film 20 is the same as described above.

The display device may be an organic light emitting diode ("OLED") display.

Figure 3:
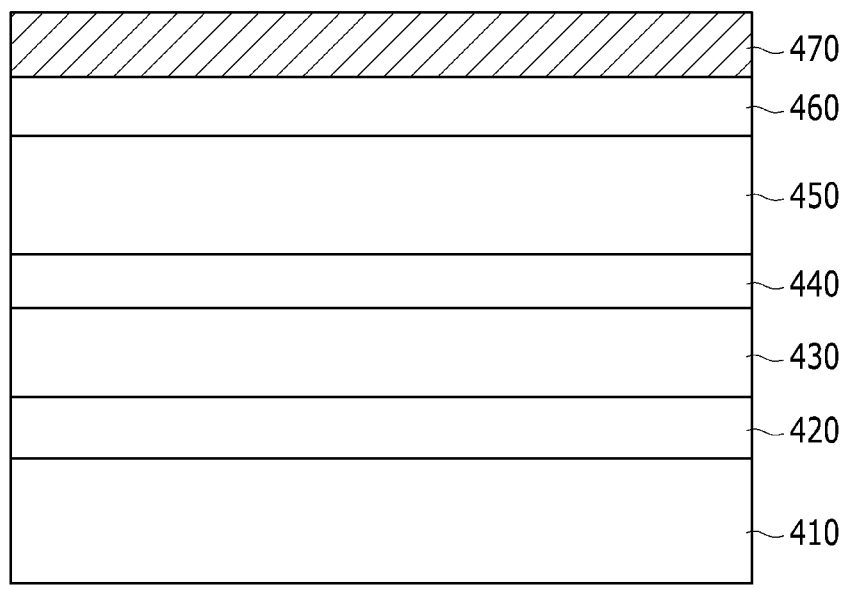
FIG. 3 is a cross-sectional view of an embodiment of an organic light emitting diode ("OLED") display.

FIG. 3 is a cross-sectional view showing an organic light emitting diode ("OLED") display according to an embodiment.

Referring to FIG. 3, an organic light emitting diode ("OLED") display according to an embodiment includes a base substrate 410, a lower electrode 420, an organic emission layer 430, an upper electrode 440, an encapsulation substrate 450, a compensation film 460, and a polarization film 470.

The base substrate 410 may be formed of glass or plastic.

Either of the lower electrode 420 and the upper electrode 440 may be an anode, while the other is a cathode. The anode is an electrode where holes are injected, and is formed of a transparent conductive material having a high work function and externally transmitting entered light, for example, ITO or IZO. The cathode is an electrode where electrons are injected, is formed of a conducting material having a low work function and having no influence on an organic material, and is selected from, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be included between the lower electrode 420 and the organic emission layer 430 and between the upper electrode 440 and the organic emission layer 430. The auxiliary layer may include a hole transport layer for balancing electrons and holes, a hole injection layer ("HIL"), an electron injection layer ("EIL"), and an electron transport layer.

The encapsulation substrate 450 may be made of glass, metal, or a polymer. The lower electrode 420, the organic emission layer 430, and the upper electrode 440 are sealed to prevent moisture and/or oxygen from externally flowing in.

The compensation film 460 may circularly polarize light passing through the polarization film 470 and generate a phase difference, and thus have an influence on reflection and absorption of the light. In an embodiment, the compensation film 460 may be, for example, a phase difference film such as λ/4 plate, and may be omitted depending on the case.

The polarization film 470 may be disposed at a light-emitting side. For example, the polarization film 470 may be disposed outside of the base substrate 410 in a bottom emission type in which light emits from the base substrate 410, and outside of the encapsulation substrate 450 in a top emission type in which light emits from the encapsulation substrate 450.

The polarization film 470 is the same as described above.

The compensation film 460 and polarization film 470 may be disposed at a display screen of an organic light emitting diode ("OLED") display and thus may play a role of an antireflective film preventing reflection of light flowing in from the outside. The antireflective film may prevent visibility deterioration due to the light flowing in from the outside.

Hereinafter, the present disclosure is illustrated in more detail with reference to examples. However, these examples are exemplary, and the present disclosure is not limited thereto.

Synthesis of Dichroic Dye

Synthesis Example 1

1-1. Synthesis of Benzothiazole Compound 11 g (0.05 mol) of 4-octyloxyaniline and 4.9 g (0.05 mol) of potassium thiocyanate (KSCN) are dissolved in 100 mL of acetic acid ("AcOH"), the solution is maintained at less than or equal to 10° C., and 0.05 mol of bromic acid (HBr) is slowly added thereto in a dropwise fashion. When the addition in a dropwise fashion is complete, the reactant is agitated while being maintained at 10° C. and then filtered. The filtered product is neutralized with 25% ammonium hydroxide and recrystallized with benzene, obtaining 9 g (0.032 mol) of a 6-octyloxy-1,3-benzothiazol-2-amine compound. The yield of the compound is 64%.

The structure of the 6-octyloxy-1,3-benzothiazole-2-amine compound is analyzed through $^1$H NMR.

The $^1$H NMR analysis result is as follows.

$^1$H NMR (300 MHz, CDCl$_3$) (ppm): 0.90 (t, J=6.0 Hz, 3H, CH$_3$), 1.20-1.43 (m, 8H, CH$_2$×4), 1.43-1.53 (m, 2H, CH$_2$), 1.77-1.86 (m, 2H, CH$_2$), 3.97 (t, J=6.2 Hz, 2H, OCH$_2$), 5.10 (brs, 2H, NH$_2$), 6.92 (d, J=8.7 Hz, 1H, ArH), 7.14 (s, 1H, ArH), 7.45 (d, J=8.7 Hz, 1H, ArH).

1-2. Synthesis of Monoazo Compound 1.4 g (5 mmol) of the 6-octyloxy-1,3-benzothiazole-2-amine compound is dissolved in a mixture of 100 mL of dimethylacetamide ("DMAc") and 25 mL of acetic acid ("AcOH"), 2.5 mL of 12N HCl is added thereto, and the mixture is maintained at 0° C. Subsequently, 348 mg (5.04 mmol) of sodium nitrate (NaNO$_2$) is dissolved in 3 mL of water, and the solution is slowly added to the reaction mixture in a dropwise fashion. When the addition in a dropwise fashion is complete, the reactant is agitated for one hour, while being maintained at 0° C. Subsequently, a solution prepared by dissolving 1.15 g (5.5 mmol) of sodium (phenylamino)methane sulfonate in 50 mL of methanol and 5 mL of dimethyl acetamide ("DMAc") is slowly added in a dropwise fashion to the reaction mixture, and the obtained mixture is agitated at 0° C. for one hour. A solid extracted through neutralization with 0.8 g (20 mmol) of sodium hydroxide (NaOH) is refluxed and agitated with 100 mL of toluene for 4 hours. The mixed solution is cooled down to room temperature, neutralized with acid, and extracted with ethylacetate ("EtOAc"). The extracted mixture is distilled under a reduced pressure and purified through silica gel column chromatography (n-hexane:EtOAc=1:1), obtaining 860 mg (2.25 mmol) of a monoazo compound. The yield of the compound is 45%.

The structure of the monoazo compound is analyzed through $^1$H NMR.

The $^1$H NMR analysis result is as follows.

$^1$H NMR (300 MHz, CDCl$_3$) (ppm): 0.89 (t, J=6.7 Hz, 3H, CH$_3$), 1.21-1.43 (m, 8H, CH$_2$×4), 1.43-1.53 (m, 2H, CH$_2$), 1.77-1.86 (m, 2H, CH$_2$), 4.03 (t, J=6.5 Hz, 2H, OCH$_2$), 4.36 (brs, 2H, NH$_2$), 6.73 (d, J=7.0 Hz, 2H, ArH), 7.07 (dd, J=8.9, 2.5 Hz, 1H, ArH), 7.28 (d, J=2.4 Hz, 1H, ArH), 7.90-7.98 (m, 3H, ArH).

1-3. Synthesis of Bisazo Dichroic Dye 382 mg (1 mmol) of the monoazo compound is dissolved in 15 mL of acetic acid (AcOH) and 15 mL of propionic acid, and the solution is maintained at less than or equal to 5° C. Subsequently, 2 mmol of nitrosyl sulfuric acid is slowly added in a dropwise fashion to the reaction mixture and then agitated while being maintained at 0° C. when the addition in a dropwise fashion is complete. Subsequently, a solution prepared by dissolving 257 mg (1.5 mmol) of N,N-dimethylnaphthalene-1-amine in 25 mL of methanol is added to the reaction mixture in a dropwise fashion, and the mixture is agitated at 0° C. for one hour. The reaction is complete after the reactant is neutralized with a sodium hydroxide (NaOH) aqueous solution, and an extracted solid therein is filtered. The obtained mixture is purified through silica gel column chromatography (n-hexane:EtOAc=4:1), obtaining 384 mg (0.68 mmol) of a dichroic dye represented by the following Chemical Formula 1a. The yield of the dichroic dye is 68%.

Chemical Formula 1a

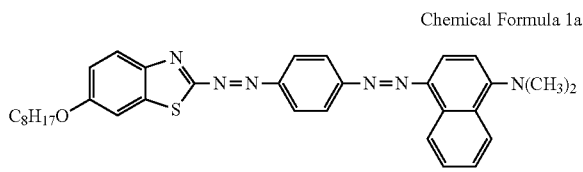

The structure of the dichroic dye represented by the above Chemical Formula 1a is analyzed through ¹H NMR.

The ¹H NMR analysis result is as follows.

¹H NMR (300 MHz, CDCl₃) (ppm): 0.90 (t, J=6.7 Hz, 3H, CH₃), 1.20-1.39 (m, 8H, CH₂×4), 1.44-1.55 (m, 2H, CH₂), 1.81-1.90 (m, 2H, CH₂), 3.06 (s, 6H, NCH₃×2), 4.07 (t, J=6.5 Hz, 2H, OCH₂), 7.10 (d, J=8.5 Hz, 1H, ArH), 7.14 (dd, J=9.0, 2.4 Hz, 1H, ArH), 7.32 (d, J=2.4 Hz, 1H, ArH), 7.56-7.70 (m, 2H, ArH), 7.97 (d, J=8.4 Hz, 1H, ArH), 8.08 (d, J=9.0 Hz, 1H, ArH), 8.15-8.24 (m, 5H, ArH), 9.06 (d, J=7.9 Hz, 1H, ArH).

Synthesis Example 2

375 mg (0.71 mmol) of a dichroic dye represented by the following Chemical Formula 1b is prepared according to the same method as Synthesis Example 1, except for using N,N,3-trimethylaniline instead of the N,N-dimethylnaphthalene-1-amine. The yield of the dichroic dye is 71%.

Chemical Formula 1b

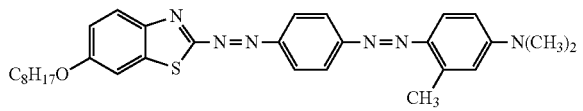

The structure of the dichroic dye represented by the above Chemical Formula 1b is analyzed through ¹H NMR.

The ¹H NMR analysis result is as follows.

¹H NMR (300 MHz, CDCl₃)(ppm): 0.90 (t, J=6.6 Hz, 3H, CH₃), 1.20-1.43 (m, 8H, CH₂×4), 1.44-1.52 (m, 2H, CH₂), 1.75-1.88 (m, 2H, CH₂), 2.74 (s, 3H, CH₃), 3.10 (s, 6H, NCH₃×2), 4.05 (t, J=6.5 Hz, 2H, OCH₂), 6.57-6.61 (m, 2H, ArH), 7.10-8.15 (m, 8H, ArH).

Synthesis Example 3

340 mg (0.62 mmol) of the dichroic dye represented by the following Chemical Formula 1c is obtained according to the same method as Synthesis Example 1, except for using 6-octyl-1,3-benzothiazole-2-amine instead of the 6-octyloxy-1,3-benzothiazole-2-amine. The yield of the dichroic dye is 62%.

Chemical Formula 1c

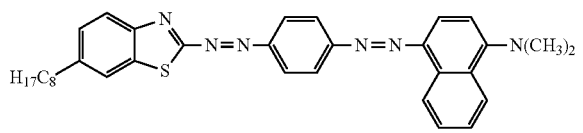

The structure of the dichroic dye represented by the above Chemical Formula 1c is analyzed through ¹H NMR.

The ¹H NMR analysis result is as follows.

¹H NMR (300 MHz, CDCl₃)(ppm): 0.96 (t, J=7.2 Hz, 3H, CH₃), 1.21-1.35 (m, 8H, CH₂×4), 1.36-1.44 (m, 2H, CH₂), 1.64-1.72 (m, 2H, CH₂), 2.71 (t, J=7.7 Hz, 2H, CH₂), 3.06 (s, 6H, NCH₃×2), 7.32-8.24 (m, 12H, ArH), 9.04 (d, J=7.9 Hz, 1H, ArH).

Comparative Synthesis Example 1

293 mg (0.67 mmol) of a dichroic dye represented by the following Chemical Formula 1d is prepared according to the same method as Synthesis Example 1, except for using 1,3-benzothiazole-2-amine instead of the 6-octyloxy-1,3-benzothiazole-2-amine. The yield of the dichroic dye is 67%.

Chemical Formula 1d

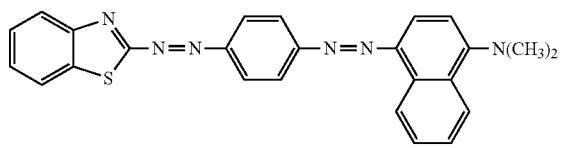

The structure of the dichroic dye represented by the above Chemical Formula 1d is analyzed through ¹H NMR.

The ¹H NMR analysis result is as follows.

¹H NMR (300 MHz, CDCl₃)(ppm): 2.96 (s, 6H, NCH₃× 2), 7.01 (d, J=8.5 Hz, 1H, ArH), 7.41-8.19 (m, 12H, ArH), 8.97 (d, J=7.9 Hz, 1H, ArH).

Comparative Synthesis Example 2

A commercially-available dichroic dye represented by the following Chemical Formula 1e is used (Showa Chem., Japan).

Chemical Formula 1e

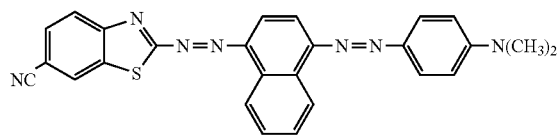

Evaluation 1: Solubility Parameter

Solubility parameters of the dichroic dyes according to Synthesis Examples 1 to 3 and Comparative Synthesis Examples 1 and 2 are calculated.

The solubility parameters are Hildebrand solubility parameters.

Intermolecular cohesion occurs by a combination of Van der Waals and dipole moments inside molecules, and energy causing such cohesion is referred to as cohesive energy ("Ecoh"). Such cohesive energy may be changes of internal energy per 1 mole, and may be represented by the following Relationship Equation 1.

$$E_{coh} = \Delta U = \Delta H - \Delta T \qquad \text{Relationship Equation 1}$$

In Relationship Equation 1,
$E_{coh}$ is cohesive energy,
$\Delta U$ is changes of internal energy per mole,
$\Delta H$ is enthalpy changes, and
$\Delta T$ is temperature changes.

Cohesive energy per unit volume may be defined as cohesive energy density ("CED"), which may be obtained by the following Relationship Equation 2.

$$CED=(\Delta H-RT)/Vm \quad \text{Relationship Equation 2}$$

In Relationship Equation 2,
CED is a cohesive energy density,
ΔH is enthalpy changes,
R is a constant,
T is a temperature, and
Vm is a mole volume.

The cohesive energy density is used to define the Hildebrand solubility parameter that numerically indicates dissolution performance, and the solubility parameter may be calculated by the following Relationship Equation 3 using a density or mole volume at a predetermined temperature.

$$\delta=(CED)^{0.5}=(\Sigma Ecoh_i/\Sigma Vm_i)^{0.5} \quad \text{Relationship Equation 3}$$

In Relationship Equation 3,
δ is a solubility parameter,
CED is a cohesive energy density,
$Ecoh_i$ is cohesive energy for a functional group i inside a molecule, and
$Vm_i$ is a mole volume.

Hildebrand solubility parameter values used for designing a structure of a dichroic dye may be calculated by group contribution of molecules.

The group contribution of cohesive energy ("Ecoh") and mole volume ("Vm") used for calculating a solubility parameter of a dichroic dye is shown in Table 1, as provided in *Polym. Eng. Sci.* 1974, 14, 147; and *J. Appl. Polym. Sci.* 2005, 96, 416, the contents of which are incorporated herein by reference in their entirety.

TABLE 1

| Group | Ecoh (J/mol) | Vm (cm³/mol) |
|---|---|---|
| —CH₃ | 4707 | 33.5 |
| —CH₂— | 4937 | 16.1 |
| —CH— | 3431 | −1.0 |
| C | 1464 | −19.2 |
| H₂C= | 4310 | 28.5 |
| —CH= | 4310 | 13.5 |
| C= | 4310 | −5.5 |
| Phenyl | 31924 | 71.4 |
| Phenylene (o, m, p) | 31924 | 52.4 |
| Phenyl (trisubstituted) | 31924 | 33.4 |
| Phenyl (tetrasubstituted) | 31924 | 14.4 |
| Phenyl (pentasubstituted) | 31924 | −4.6 |
| Phenyl (hexasubstituted) | 31924 | −23.6 |
| Ring closure 5 or more atoms | 1046 | 16.0 |
| Ring closure 3 or 4 atoms | 3138 | 18.0 |
| —COOH | 27614 | 28.5 |
| —CO₂— | 17991 | 18.0 |
| —CO— | 17364 | 10.8 |
| —CONH— | 33472 | 9.5 |
| —NH₂ | 12552 | 19.2 |
| —NH— | 8368 | 4.5 |
| N | 4184 | −9.0 |
| —N= | 11715 | 5.0 |
| —N=N— | 4188 | 0.0 |
| —CN | 25522 | 24.0 |
| NO₂ | 15355 | 32.0 |
| —O— | 3347 | 3.8 |
| —OH | 29790 | 10.0 |
| S | 14142 | 12.0 |
| —F | 4184 | 18.0 |
| —Cl | 11548 | 24.0 |
| —Br | 15481 | 30.0 |
| —I | 19037 | 31.5 |

Solubility parameters of the dichroic dyes according to Synthesis Examples 1 to 3 and Comparative Synthesis Examples 1 and 2 which are calculated by a Hildebrand solubility parameter are shown in Table 2.

TABLE 2

|  | Solubility parameter |
|---|---|
| Synthesis Example 1 | 24.0 |
| Synthesis Example 2 | 22.5 |
| Synthesis Example 3 | 23.9 |
| Comparative Synthesis Example 1 | 26.5 |
| Comparative Synthesis Example 2 | 27.1 |

Manufacturing Polarization Film

Example 1

A composition for a polarization film is prepared by mixing a polyolefin (solubility parameter: 16.6) including polypropylene ("PP") and a polypropylene-polyethylene copolymer ("PP-PE") in a ratio of 5:5 (weight/weight), and 0.5 parts by weight of the dichroic dye according to the Synthesis Example 1, based on 100 parts by weight of the polyolefin.

The composition for a polarization film is melt-blended at about 250° C. using a micro-compounder ("DSM"). The melt blend is put in a sheet mold and pressed at a high temperature and a high pressure, manufacturing a film. The film is elongated 1,000% in a uniaxial direction (Instron Ltd.) at 125° C., manufacturing a polarization film.

Example 2

A polarization film is manufactured according to the same method as Example 1, except for using the dichroic dye according to Synthesis Example 2 instead of the dichroic dye according to Synthesis Example 1.

Example 3

A polarization film is manufactured according to the same method as Example 1, except for using the dichroic dye according to Synthesis Example 3 instead of the dichroic dye according to Synthesis Example 1.

Comparative Example 1

A polarization film is manufactured according to the same method as Example 1, except for using the dichroic dye according to Comparative Synthesis Example 1 instead of the dichroic dye according to Synthesis Example 1.

Comparative Example 2

A polarization film is manufactured according to the same method as Example 1, except for using the dichroic dye according to Comparative Synthesis Example 2 instead of the dichroic dye according to Synthesis Example 1.

Evaluation 2: Polarization Properties

Polarization efficiency and dichroic ratio of the polarization films according to Examples 1 to 3 and Comparative Examples 1 and 2 are evaluated.

Polarization efficiency and dichroic ratio are obtained using transmittance.

The transmittance is evaluated by respectively measuring light transmittance of light entering parallel to the transmissive axis of the polarization film and light transmittance of light entering perpendicular to the transmissive axis of the polarization film.

The transmittance is used to calculate a dichroic ratio ("DR") and polarization efficiency ("PE").

The dichroic ratio ("DR") is obtained according to the following Equation 1.

$$DR = \text{Log}(1/T_\perp)/\text{Log}(1/T_{//}) \quad \text{Equation 1}$$

In Equation 1,

DR denotes a dichroic ratio, $T_{//}$ is transmittance of polarization film regarding light parallel to the transmissive axis of a polarization film, and $T_\perp$ is transmittance of polarization film regarding light perpendicular to the transmissive axis of the polarization film.

The polarization efficiency is obtained according to the following Equation 2.

$$PE(\%) = [(T_{//}-T_\perp)/(T_{//}-T_\perp)]^{1/2} \times 100 \quad \text{Equation 2}$$

In Equation 2,

PE denotes polarization efficiency, $T_{//}$ is transmittance of polarization film regarding light parallel to the transmissive axis of a polarization film, and $T_\perp$ is transmittance of polarization film regarding light perpendicular to the transmissive axis of the polarization film.

Figure 4:
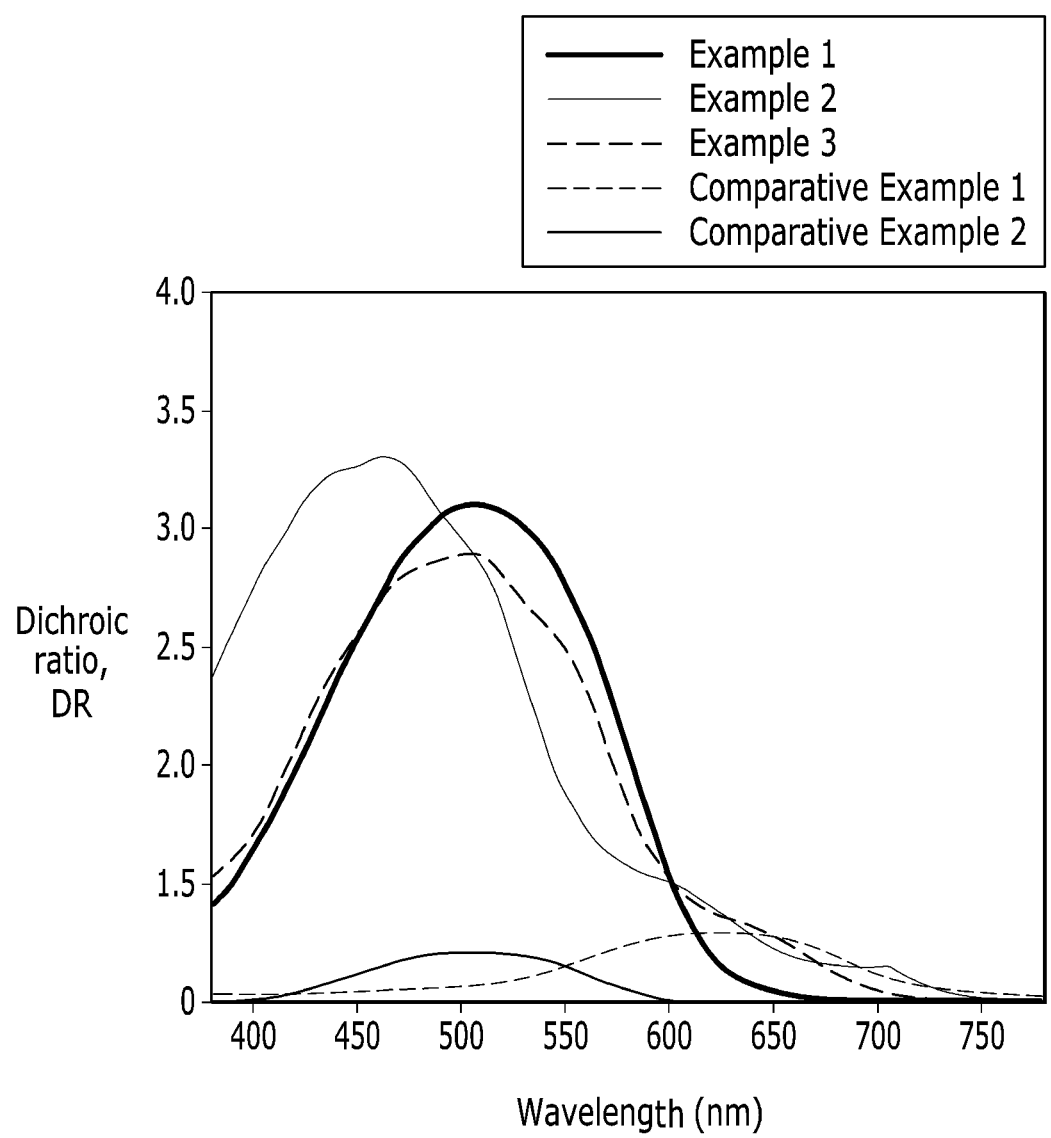
FIG. 4 is a graph of dichroic ratio (DR) versus wavelength (nanometers) showing dichroic ratios in a visible ray region according to the polarization films according to Examples 1 to 3 and Comparative Examples 1 and 2.

The results are illustrated referring to Table 3 and FIG. 4.

FIG. 4 is a graph showing dichroic ratios in a visible ray region according to the polarization films according to Examples 1 to 3 and Comparative Examples 1 and 2.

In Table 3, polarization efficiency, and dichroic ratio of the polarization films according to Examples 1 to 3 and Comparative Examples 1 and 2 are measured at the maximum absorption wavelength ("$\lambda_{max}$").

TABLE 3

| | $\lambda_{max}$ (nm) | Polarization efficiency (PE, %) | Dichroic ratio (DR) | Solubility parameter difference (dye − polyolefin) |
|---|---|---|---|---|
| Example 1 | 500 | 98.65 | 3.1 | 7.4 |
| Example 2 | 465 | 97.78 | 3.3 | 5.9 |
| Example 3 | 505 | 96.58 | 3.0 | 7.3 |
| Comparative Example 1 | 505 | 25.59 | 1.2 | 9.9 |
| Comparative Example 2 | 620 | 23.12 | 1.3 | 10.5 |

Referring to Table 3 and FIG. 4, the polarization films according to Examples 1 to 3 show higher polarization efficiency and dichroic ratios than those of Comparative Examples 1 and 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for a polarization film comprising:
   a transparent resin having a boiling point of greater than or equal to 130° C.; and
   a dichroic dye represented by Chemical Formula 1, wherein a solubility parameter of the dichroic dye is less than or equal to about 24,
   wherein a difference between a solubility parameter of the transparent resin and a solubility parameter of the dichroic dye is less than or equal to about 7.4, and the composition has a solid content of greater than or equal to about 90 weight percent:

Chemical Formula 1

[Chemical structure: benzothiazole ring with substituents $R^1$, $R^2$, $R^3$, $R^4$ connected via $-N=N-Ar^1-N=N-Ar^2-(N=N-Ar^3)_n-N(R^5)(R^6)$]

wherein, in Chemical Formula 1, $Ar^1$ to $Ar^3$ are each independently a substituted or unsubstituted C6 to C15 arylene group, $R^1$ to $R^4$ are each independently hydrogen, a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, at least one of $R^1$ to $R^4$ is a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof, $R^5$ and $R^6$ are each independently hydrogen, a substituted or unsubstituted C1 to C20 alkyl group, or are linked to each other to form a ring, and n is an integer ranging from 0 to 2.

2. The composition for a polarization film of claim 1, wherein the transparent resin comprises a polyolefin, a polyester, or a combination thereof.

3. The composition for a polarization film of claim 2, wherein the transparent resin comprises a polyolefin, and
   the polyolefin comprises polyethylene, polypropylene, a copolymer thereof, or a combination thereof.

4. The composition for a polarization film of claim 3, wherein a solubility parameter of the polyolefin is about 15 to about 18.

5. The composition for a polarization film of claim 3, wherein the polyolefin is a combination of polypropylene and a polyethylene-polypropylene copolymer, and
   the polyethylene-polypropylene copolymer has an ethylene content of about 1 to about 50 weight percent.

6. The composition for a polarization film of claim 2, wherein the transparent resin comprises a polyester, and
   the polyester comprises polyethylene terephthalate, polyethylene naphthalate, modified polyethylene terephthalate glycol, a copolymer thereof, or a combination thereof.

7. The composition for a polarization film of claim 6, wherein a solubility parameter of the polyester is about 15 to about 21.

8. The composition for a polarization film of claim 1, wherein the composition does not include a solvent.

9. A polarization film comprising:
a transparent resin having a boiling point of greater than or equal to 130° C., and
a dichroic dye represented by Chemical Formula 1, wherein a solubility parameter of the dichroic dye is less than or equal to about 24,
wherein a difference between a solubility parameter of the transparent resin and a solubility parameter of the dichroic dye is less than or equal to about 7.4, and
the polarization film comprises a melt-blend of the transparent resin and the dichroic dye, the melt-blend being a product obtained by melt-blending a composition of the transparent resin and the dichroic dye:

Chemcial Formula 1

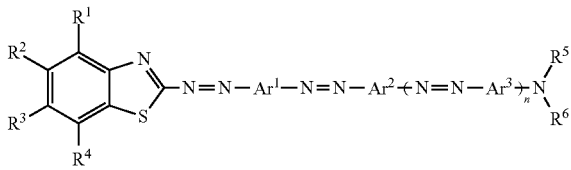

wherein, in Chemical Formula 1,
$Ar^1$ to $Ar^3$ are each independently a substituted or unsubstituted C6 to C15 arylene group,
$R^1$ to $R^4$ are each independently hydrogen, a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof,
at least one of $R^1$ to $R^4$ is a substituted or unsubstituted C1 to C20 alkyl group, a substituted or unsubstituted C1 to C20 alkoxy group, a substituted or unsubstituted C1 to C20 alkylthio group, a substituted or unsubstituted C1 to C30 alkanoyl group, a substituted or unsubstituted C3 to C20 cycloalkyl group, a substituted or unsubstituted C3 to C20 heterocycloalkyl group, a substituted or unsubstituted C6 to C30 aryl group, a substituted or unsubstituted C3 to C30 heteroaryl group, a substituted or unsubstituted C2 to C20 alkenyl group, a substituted or unsubstituted C2 to C30 alkynyl group, or a combination thereof,
$R^5$ and $R^6$ are each independently hydrogen, a substituted or unsubstituted C1 to C20 alkyl group, or are linked to each other to form a ring, and
n is an integer ranging from 0 to 2.

10. The polarization film of claim 9, wherein the transparent resin comprises a polyolefin, a polyester, or a combination thereof.

11. The polarization film of claim 10, wherein the transparent resin comprises a polyolefin, and
the polyolefin comprises polyethylene, polypropylene, a copolymer thereof, or a combination thereof.

12. The polarization film of claim 11, wherein a solubility parameter of the polyolefin is about 15 to about 18.

13. The polarization film of claim 10, wherein the transparent resin comprises a polyester, and
the polyester comprises polyethylene terephthalate, polyethylene naphthalate, modified polyethylene terephthalate glycol, a copolymer thereof, or a combination thereof.

14. The polarization film of claim 13, wherein a solubility parameter of the polyester is about 15 to about 21.

15. The polarization film of claim 9, wherein the polarization film has a dichroic ratio of about 3 to about 10 at a maximum absorption wavelength in a visible wavelength region,
wherein the dichroic ratio is represented by Equation 1:

$$DR = \text{Log}(1/T_\perp)/\text{Log}(1/T_{//})$$ Equation 1 wherein, in Equation 1,
DR denotes a dichroic ratio of a polarization film,
$T_{//}$ is a transmittance of the polarization film for light parallel to a transmissive axis of the polarization film, and $T_\perp$ is a transmittance of the polarization film for light perpendicular to the transmissive axis of the polarization film.

16. A display device comprising the polarization film according to claim 9.

* * * * *